United States Patent
D'Acunto et al.

(10) Patent No.: US 10,110,951 B2
(45) Date of Patent: Oct. 23, 2018

(54) COORDINATED BACKGROUND TV RECOGNITION

(71) Applicant: AXWAVE INC., Palo Alto, CA (US)

(72) Inventors: Loris D'Acunto, Palo Alto, CA (US); Damian Ariel Scavo, Palo Alto, CA (US)

(73) Assignee: AXWAVE INC., Palo Alto, CA (US)

( * ) Notice: Subject to any disclaimer, the term of this patent is extended or adjusted under 35 U.S.C. 154(b) by 0 days.

(21) Appl. No.: 15/274,745

(22) Filed: Sep. 23, 2016

(65) Prior Publication Data

US 2017/0134802 A1     May 11, 2017

Related U.S. Application Data

(63) Continuation of application No. 14/695,808, filed on Apr. 24, 2015.

(60) Provisional application No. 61/983,990, filed on Apr. 24, 2014.

(51) Int. Cl.

| | |
|---|---|
| *H04N 21/442* | (2011.01) |
| *H04N 21/443* | (2011.01) |
| *H04N 21/439* | (2011.01) |
| *H04N 21/436* | (2011.01) |
| *H04N 21/258* | (2011.01) |
| *H04N 21/422* | (2011.01) |
| *H04N 21/81* | (2011.01) |
| *H04N 21/2668* | (2011.01) |
| *H04N 21/41* | (2011.01) |

(52) U.S. Cl.
CPC ..... *H04N 21/44213* (2013.01); *H04N 21/258* (2013.01); *H04N 21/4126* (2013.01); *H04N 21/42203* (2013.01); *H04N 21/436* (2013.01); *H04N 21/439* (2013.01); *H04N 21/4394* (2013.01); *H04N 21/443* (2013.01); *H04N 21/812* (2013.01); *H04N 21/2668* (2013.01); *H04N 21/4431* (2013.01)

(58) Field of Classification Search
CPC ........... H04N 21/44213; H04N 21/436; H04N 21/4394; H04N 21/443
See application file for complete search history.

(56) References Cited

U.S. PATENT DOCUMENTS

| | | | | |
|---|---|---|---|---|
| 2005/0144632 A1* | 6/2005 | Mears | ................... | H04H 60/31 725/15 |
| 2005/0268302 A1* | 12/2005 | Geib | ................... | G06F 9/4881 718/100 |
| 2012/0311074 A1 | 12/2012 | Arini et al. | | |
| 2014/0161264 A1* | 6/2014 | Kirkbak | ............... | G08B 21/182 381/56 |

(Continued)

*Primary Examiner* — Benjamin R Bruckart
*Assistant Examiner* — Susan X Li
(74) *Attorney, Agent, or Firm* — Procopio, Cory, Hargreaves & Savitch LLP (57) ABSTRACT

Techniques to coordinate ambient media detection are disclosed. A request to become active in performing media detection processing with respect to the audio environment is received from a first ambient media detection agent associated with an audio environment. A response denying the request is sent to the first ambient media detection agent if it is determined that a second ambient media detection agent associated with the audio environment currently is active in performing media detection processing with respect to the audio environment.

18 Claims, 8 Drawing Sheets

(56) References Cited

U.S. PATENT DOCUMENTS

2015/0193785 A1\* 7/2015 Besehanic .......... G06Q 30/0201
705/7.32

\* cited by examiner

| ID | Last Active | Timestamp |
|---|---|---|
| xyz123 | App 1 | Apr-24-2015 09:14:42 UTC |
| . . . | | |
| . . . | | |

FIG. 8

COORDINATED BACKGROUND TV RECOGNITION

CROSS REFERENCE TO OTHER APPLICATIONS

This application is a continuation of U.S. patent application Ser. No. 14/695,808 filed Apr. 24, 2015, which claims priority to U.S. Provisional Patent Application No. 61/983,990 entitled COORDINATED BACKGROUND TV RECOGNITION filed Apr. 24, 2014 which is incorporated herein by reference for all purposes.

BACKGROUND OF THE INVENTION

Users often consume media, such a live or on demand TV broadcast or other media content, in an environment (e.g., a room in their home or office) in which one or more devices are available for their use. For example, a TV show may be playing in a room in which one or more viewers each has access to a mobile phone, tablet, or other mobile device; a personal computer (PC), laptop, or other computing device; a smart TV or other "smart" consumer electronic device; etc. In current approaches, typically a user's experience with respect to such other devices has been distinct from the media being consumed in the environment.

More than one mobile app or other software provided to run on a client device may have the capability to perform the same processing. Similarly, more than one device in a physical site may have the capability to perform the same processing, e.g., associated with a monitoring or detection function. Typically, applications on a mobile device, for example, or applications running on different devices do not have any and/or effective means to communicate with and coordinate among each other.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Coordinated detection of ambient media, such as a television or other media channel, in an audio or other environment is disclosed. In various embodiments, a TV or other media content recognition app, software, or other code may be included in or otherwise associated with more than on app, application, or other code running on a device. For example, in some embodiments, a software development kit (SDK), library, and/or other code may be incorporated into one or more apps, each of which as a result becomes capable of listening, which the app is running in the background, for example, to the audio environment in which the device on which the app is running is present.

In various embodiments, one or more features of the ambient sound may be extracted, for example by the SDK or other code and/or by a dedicated client on the same device, and used to attempt to recognize whether a TV or other component is "on" and rendering media in the environment, such as a TV program or commercial, and if so which specific TV program or commercial is being rendered, which TV or other channel or service the determined content is associated with, etc.

Techniques to avoid having more than one app consume device resources to perform listening and/or other recognition related tasks at the same time are disclosed. In various embodiments, the ability to switch the respective listening process of each of a plurality of apps "on" or "off", e.g., to optimize device resource usage, is provided.

For example, in some embodiments, a user may be watching a TV show in the living room while a "background TV recognizer"—equipped device (a smartphone, a TV, a gaming console, etc.) is in sufficiently close proximity to detect and receive the audio content of the TV show. Inside that device, one or more apps equipped to perform listening and/or other recognition-related tasks with respect to the audio content of the environment may be working in background mode. Techniques disclosed herein may be used to ensure that only one of the apps actually consumes the device and network bandwidth resources required to perform media detection.

Figure 1:
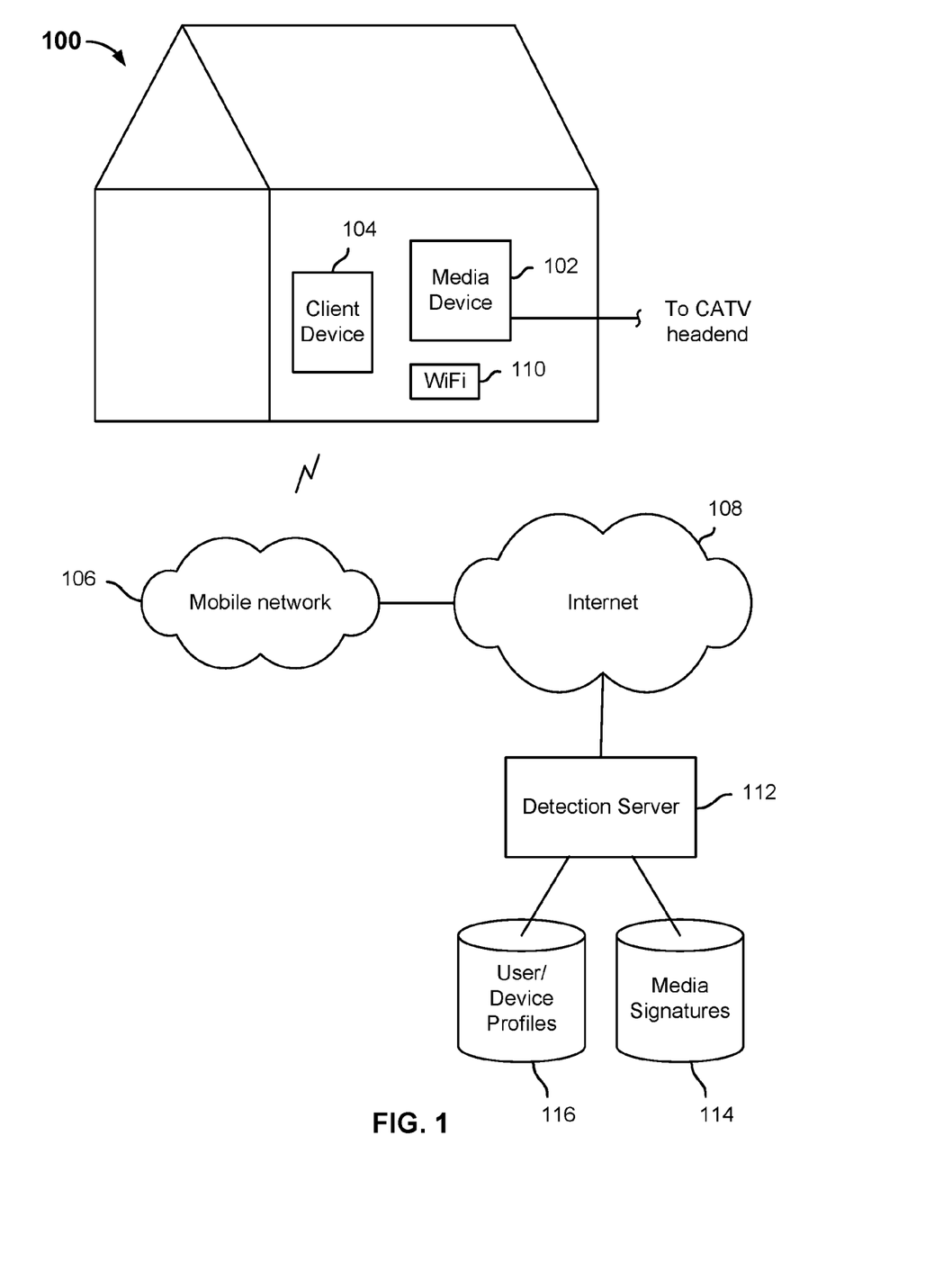
FIG. 1 is a block diagram illustrating an embodiment of a system to detect ambient media.

FIG. 1 is a block diagram illustrating an embodiment of a system to detect ambient media. In the example shown, an ambient media detection system and environment 100 includes a media device 102, in this example a TV or other display device connected to a cable television (CATV) headend (or other audiovisual media distribution node). A client device 104 configured to detect media in an environment in which the client device 104 is located is present in the same location. In the example shown, the client device 104 is shown as a device separate from media device 102, but in various embodiments the client device 104 may be included in and/or the same as media device 102. Examples of media device 102, in various embodiments, include without limitation a "smart" TV or other media display device having a network connection and processor; a media player device; a gaming console, system, or device having a display and/or speakers; a home theater system; an audio and/or video component system; a home desktop or other computer; a portable device, such as a tablet or other smart device usable to play audiovisual content; etc. Examples of client device 104, in various embodiments, include without limitation one or more of the foregoing examples of media device 102 and/or any other device having or capable of being configured to include and/or receive input from a microphone, a processor, and a network or other communication interface, e.g., a cable TV decoder or other connectivity device (e.g., separate from a TV or other display); a gaming console, system, or device; a home desktop or other computer; a portable device, such as a tablet or mobile phone; etc.

In the example shown in FIG. 1, the client device 104 is configured to monitor an ambient audio environment in a location in which the client device 104 is present. In various embodiments, the client device 104 may be configured to monitor the ambient audio environment by accessing and using a microphone comprising and/or connected to client device 104. The client device 104 may be configured to execute software code, such as a mobile or other application and/or code incorporated into such an application, e.g., using a software development kit (SDK), or other techniques, to perform TV or other media content detection as disclosed herein.

In various embodiments, client device 104 is configured to sample the ambient environment to determine if conditions are present to enable media detection to be performed. For example, the client device 104 may determine whether an ambient sound level in proximity of the client device 104 is sufficiently high to perform media detection, whether characteristics possibly associated with media content are detected, etc. In some embodiments, client device 104 may be configured to attempt to perform media detection only at configured and/or configurable times, e.g., certain times of day, different times of day depending on the day of the week, on days/times learned over time to be times when the client device 104 may be in an environment in which media is being played (e.g., user often watches TV on weekday evenings but rarely during the workday, etc.), etc.

In the example shown in FIG. 1, client device 104 sends audio data and/or a representation thereof, such as a "feature" set extracted and/or otherwise determined from the ambient audio environment, via a wireless connection to an associated mobile network 106, which provides access to the Internet 108. In some embodiments, a WiFi access node, such as WiFi access node 110 in the example shown, may be used by client device 104. In various embodiments, any Internet or other network access (e.g., cable, mobile) may be used. However the connection to the Internet 108 is made, client device 104 uses the connection to send audio data and/or a representation thereof to a remote detection server 112.

Detection server 112 uses media content signatures in a media signatures database (or other data store) 114 to determine if data received from client device 114 matches known media content. For example, in some embodiments, media signatures 114 may include for each of a plurality of cable TV or other broadcast channels a corresponding set of "feature sets" each of which is associated with a media content and/or portion thereof that is being, was, and/or is expected to be broadcast (or otherwise provided, e.g., streamed, etc.), e.g., at an associated time of a given day. For example, a backend process not shown in FIG. 1 may be used to receive and process a stream or other set of media content data and associated times (e.g., timestamps) at which respective portions of the content have been and/or will be broadcast, streamed, etc.

In various embodiments, detection server 112 may be configured to determine based on data received from the client device 104 and the media signatures 114 that a particular cable or other TV channel is being viewed at the location in which the client device 104 sampled the ambient audio environment. In some embodiments, the detected channel and/or information determined based at least in part thereon may be communicated to one or more of the client device 104 and the media device 102. For example, advertising or other content associate with a program being broadcast on a cable channel that has been detected in the ambient audio environment may be served to the client device 104. In the example shown, detection server 112 may be configured to update one or more profiles associated with a user, a device (e.g., media device 102 and/or client device 104), and/or a location (e.g., one associated with media device 102 and/or client device 104, and/or determined based on a GPS or other location service of client device 104) may be updated in a user/device profiles database 116.

In various embodiments, user, device, and/or location profiles stored in profiles database 116 may include one or more of user profile data that was provided explicitly by and/or inferred about a user; historical data indicating which media channels have been detected in a given environment and/or by a given client device and at which times and days of the week, etc.; records of content or other data provide to a user, location, and/or device based at least in part on media channel and/or content detection, etc.

Figure 2:
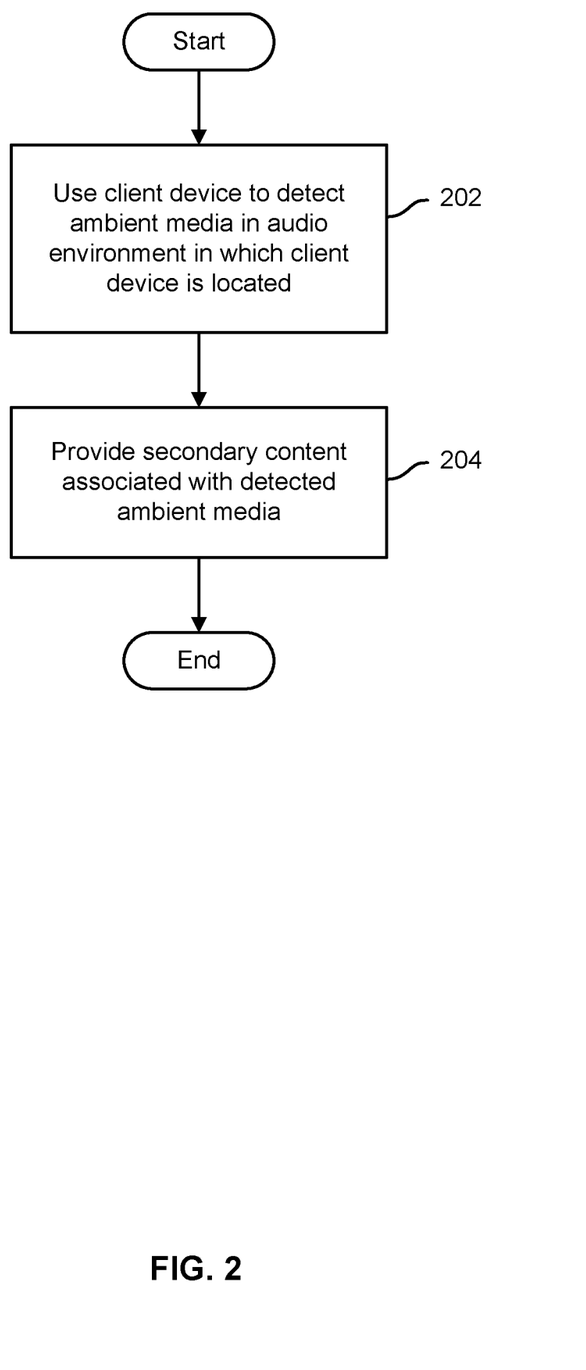
FIG. 2 is a flow chart illustrating an embodiment of a process to provide content related to detected media.

FIG. 2 is a flow chart illustrating an embodiment of a process to provide content related to detected media. In various embodiments, the process of FIG. 2 may be implemented by one or more client devices, e.g., client device 104 of FIG. 1, in communication and cooperation with one or more servers, e.g., detection server 112 of FIG. 1. In the example shown, a client device is used to detect ambient media in an audio (or other sensory) environment in which the client device is located (202). The client device may, in various embodiments, be configured to extract a feature set or other representation from ambient audio (or other) data and to send the feature set or other representation, and/or data derived therefrom, to a remote detection server. The server may be configured to receive and process feature sets or other representations received from respective clients. Secondary content associated with the detected audio (or other media) environment is provided (204). For example, the server may be configured to detect based on the received feature set that a media channel, e.g., that a given cable TV channel, is being viewed or otherwise rendered at a location in which the client is located. Based on the foregoing determination, the server may be configured to select related secondary content (e.g., advertising content, games, trivia questions, etc.) and provide the secondary content via an appropriate delivery channel, e.g., via the device being used to view the media channel and/or the device (if separate) used to detect the media environment.

Figure 3:
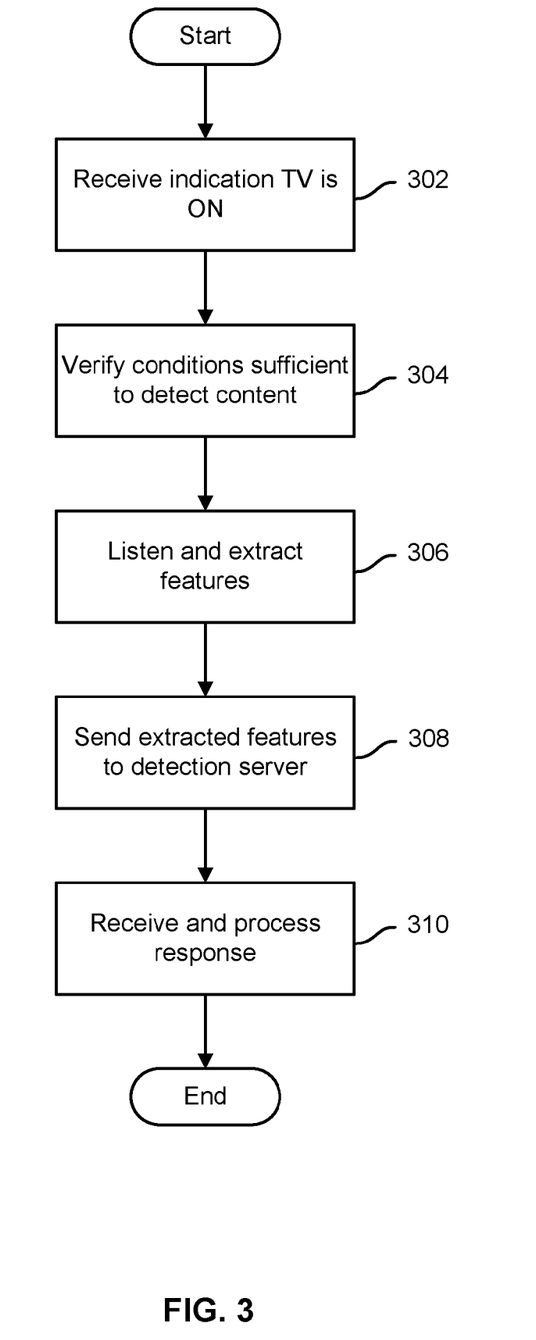
FIG. 3 is a flow chart illustrating an embodiment of a client-side process to detect media content that is being rendered in an audio environment.

FIG. 3 is a flow chart illustrating an embodiment of a client-side process to detect media content that is being rendered in an audio environment. The process of FIG. 3 may be performed by a client device, such as client device 104 of FIG. 1. In various embodiments, the process of FIG. 3 may be performed by a client device as part of a service to listen for, recognize, and potentially take action based on a determination that specific TV or other media content, e.g., a particular TV or other program, is being rendered in an environment in which a device performing the process of FIG. 3 is located. In various embodiments, the process of continuously, periodically, and/or regularly checking for the presence of a TV or other media content being rendered in an environment in which a device is located is referred to as "perpetual TV listening".

In the example shown in FIG. 3, an indication is received that a TV or other media player/display device is "on" (302). A check is performed to determine (or verify) that the conditions are (remain) suitable to detect a specific TV or other content that is being rendered (304). For example, a check may be performed to determine and/or confirm that the present time of day is an appropriate time to perform detection, and a check may be performed to determine whether there is a sufficient audio signal level in the location. If the conditions are not suitable, the process may restarts again, e.g., after a prescribed interval.

If the conditions are suitable (304), the client listens to the environment sound for a period of time and extracts features to be used to identify the media being rendered near the detecting device (306). The extracted feature data and/or a representation thereof is/are sent (308) to a remote detection server, such as detection server 112 of FIG. 1, to be used at the server to perform TV program or commercial (or other media content) recognition.

In various embodiments, the server is configured to attempt to recognize the TV program, commercial, or other media content that is being rendered in the environment in which the client device performing the process of FIG. 3 is located. In various embodiments, the server may be configured to send to the client one or both of an identification of the media channel and/or content that has been detected and secondary content to be used by the client, e.g., to be displayed or otherwise made available to a user of the client device. The client receives and processes the response (310).

Examples of content that may be received by the client device include, without limitation, application data to be used by an associated application on the client device. For example, if a particular sporting event is detected, an associated fan application may be activated and may begin to retrieve associated content from an associated application server. Or, if content associated with a movie trailer or movie review is detected, an application usable to locate and purchase tickets to watch the movie in a local movie theater may be activated to present information about show times and/or purchasing tickets to see the movie, etc.

After data associated with a recognized TV program or commercial has been saved at the server and sent to the client, the process sleeps for a fixed (or other) amount of time and then it restarts again checking the TV environment, e.g., through another iteration of the process of FIG. 3.

Coordinated ambient media detection, via coordinated efforts by multiple listening agents, is disclosed. In various embodiments, each of a plurality of apps installed in a client device may be configured (e.g., by SDK or otherwise) to perform TV or other media content recognition-related tasks, such as listening to the audio environment in which the device is present. In various embodiments, each such app (or other agent) contacts a specific service (e.g., continuously, as scheduled, periodically, on occurrence of an event, etc.) asking for a "green light" to operate and start to recognize the TV or other media content. The service may be in the same device or connected via a network, such as a local area network (LAN) or the Internet. In various embodiments, at any given time, only one app will be in charge of TV or other media recognition, reducing the usage of device resources (e.g., CPU and memory of the device) and communication bandwidth.

Figure 4:
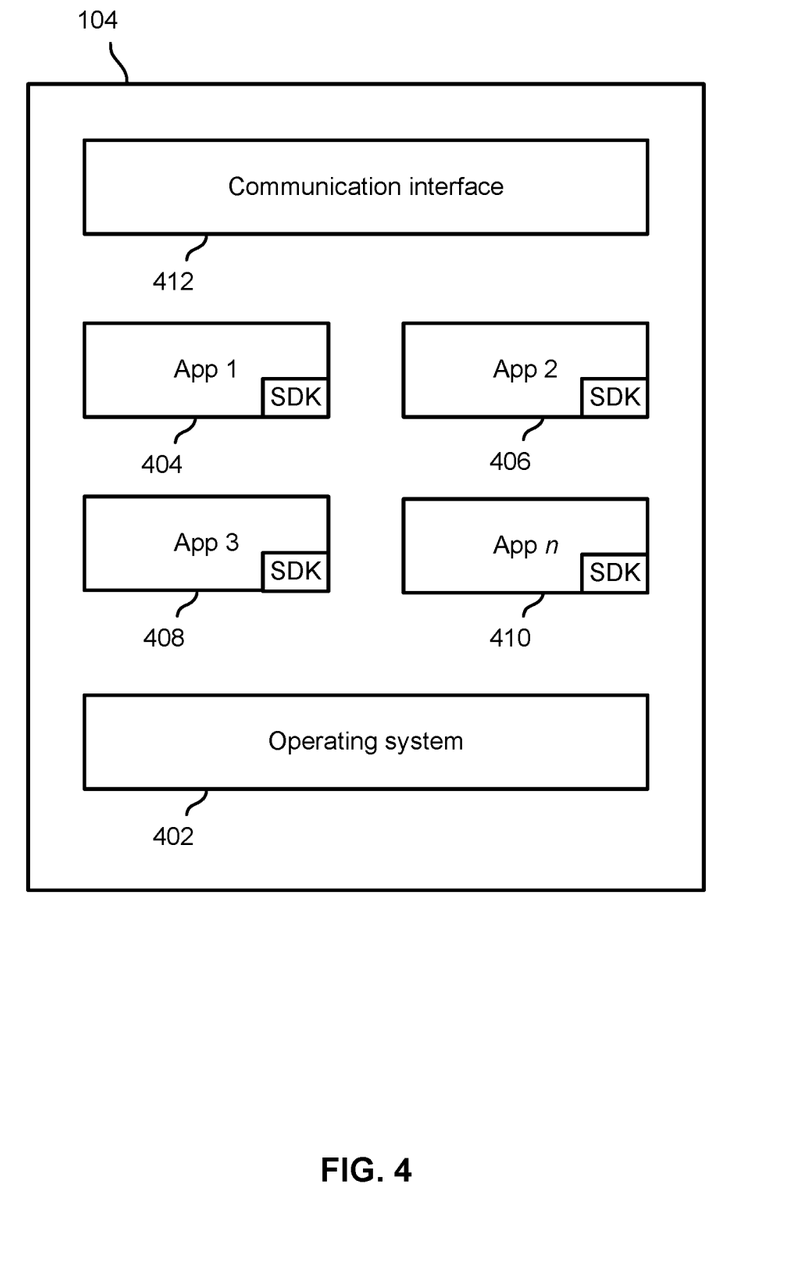
FIG. 4 is a block diagram illustrating an embodiment of a system to detect ambient media.

FIG. 4 is a block diagram illustrating an embodiment of a system to detect ambient media. In the example shown, the client device 104 includes an operating system 402 (e.g., iOS, Android, etc.) running on a processor (not shown) comprising device 104. In addition, a plurality of mobile (or other) apps represented in FIG. 4 by apps 404, 406, 408, and 410, are installed on the device 104. In the example shown, each of the apps 404, 406, 408, and 410 includes software code associated with a software development kit (SDK) that provides an ambient media detection capability, such as the ability to listen to the ambient audio or other sensory environment, extract features therefrom, and provide the features to a remote server to be used to detect a media channel and/or content in the environment. While in this example all of the apps shown include the SDK, in other examples and/or embodiments one or more apps may include the SDK (or other code) and one or more other apps may not. Each of the apps 404, 406, 408, and 410 has access to and is configured to use communication interface 412 to communicate via network communications with a remote server, such as detection server 112 of FIG. 1. For example, the SDK (or other) code include in each of the apps 404, 406, 408, and 410 may be configured to use a microphone (not shown) of device 104 to listen to the ambient audio environment of the location in which device 104 is present, extract features therefrom, and report the features using the communication interface 412. In various embodiments, a memory or other storage device (not shown) comprising (e.g., included in) device 104 may be configured to store one or more of the respective apps 404, 406, 408, and 410; the audio data sampled from the ambient environment; and the extracted features.

In various embodiments, one or more of apps 404, 406, 408, and 410 may be configured to receive, in response to a media content detected based on a feature set extracted and sent to a detection server by one of them, an indication of the media content that has been detected and/or secondary content that has been selected and/or generated based at least in part on such a detection. For example, media content detected based on a feature set extracted and provided to a remote detection server by SDK or other code associated with app 404 may result in second content being provided via app 406.

Figure 5:
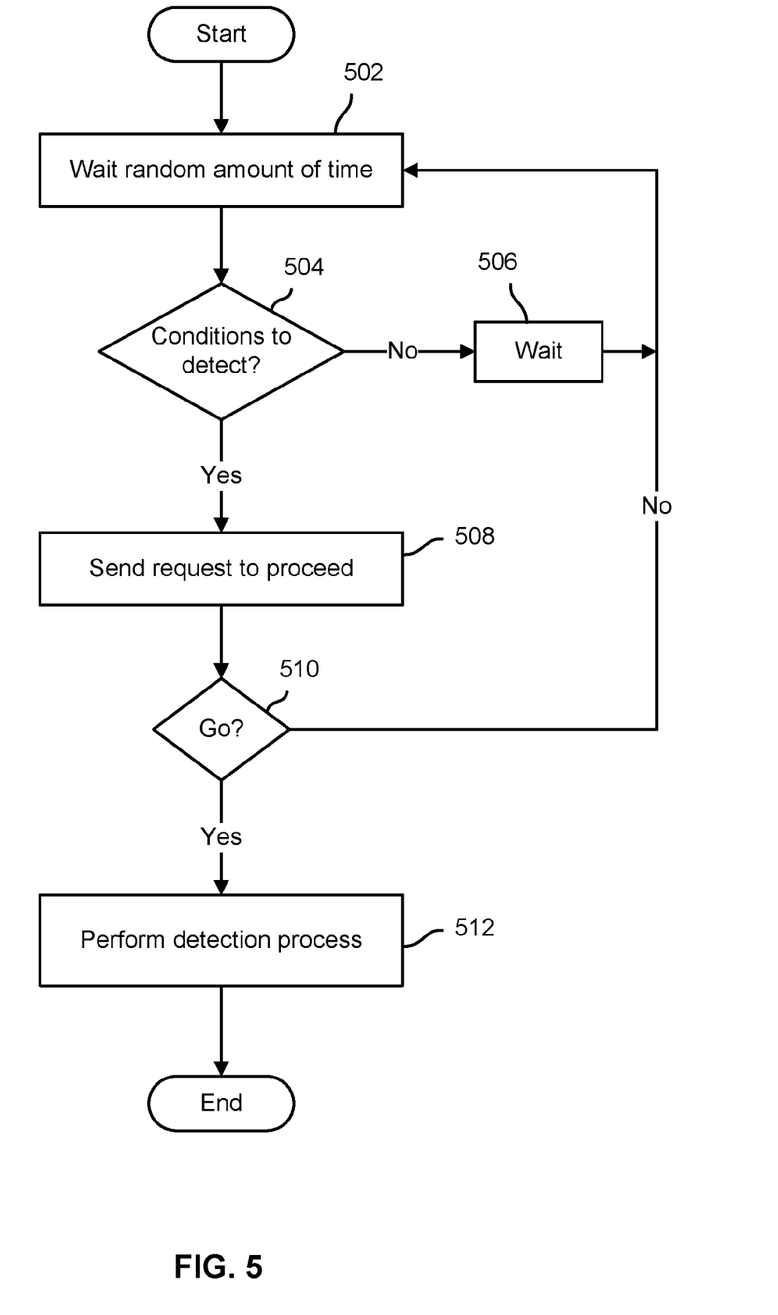
FIG. 5 is a flow chart illustrating an embodiment of a process to perform media detection processing at a client device.

FIG. 5 is a flow chart illustrating an embodiment of a process to perform media detection processing at a client device. In various embodiments, SDK or other code comprising apps on a device, such as the SDK code shown as being included in apps 404, 406, 408, and 410 in the example shown in FIG. 4, may be configured to perform the process of FIG. 5. In the example shown, the app (or other code) waits a random (or other, e.g., configured) amount of time (502) before determining whether conditions exist to perform detection (504). In some embodiments, the process of FIG. 5 is performed by an app (e.g., after the random delay) upon the app becoming active in the background. If the conditions are determined to not be appropriate to perform detection processing (506), e.g., because it is not a configured time of day to detect media (e.g., not between 7 am and 2 am), or sound levels in the ambient environment are not sufficient, then the app waits a configured amount of time (506) before checking again whether conditions are appropriate to perform detection processing. If/once conditions are determined to be appropriate to perform media detection processing (506), a request to become active in media detection is sent, e.g., to a detection or other coordinating server and/or local service (508). In some embodiments, an app or other code may be configured to begin performing detection processing without first sending a request to the server/service if the app is running in the foreground (e.g., currently in active use by a user of the device 104), as opposed to the background.

If the response received from the server/service indicates the app should begin to perform detection processing (510), the app begins such processing (512). For example, the app may listen to the audio environment, extract features, and send the features to the remote detection server.

If the server indicates the requesting app should not become active in performing media detection processing (510), the app or other code waits a further random or other period (502) before performing a further iteration of the process of FIG. 5. For example, the server may be configured to tell a requesting app not to become active in media detection if the server has received a feature set or other audio data from another app (or other code) on the same device within a prescribed interval. In this way, in various embodiments, the resource consumption that would be associated with multiple apps performing the same detection processing on a single device may be avoided.

Figure 6:
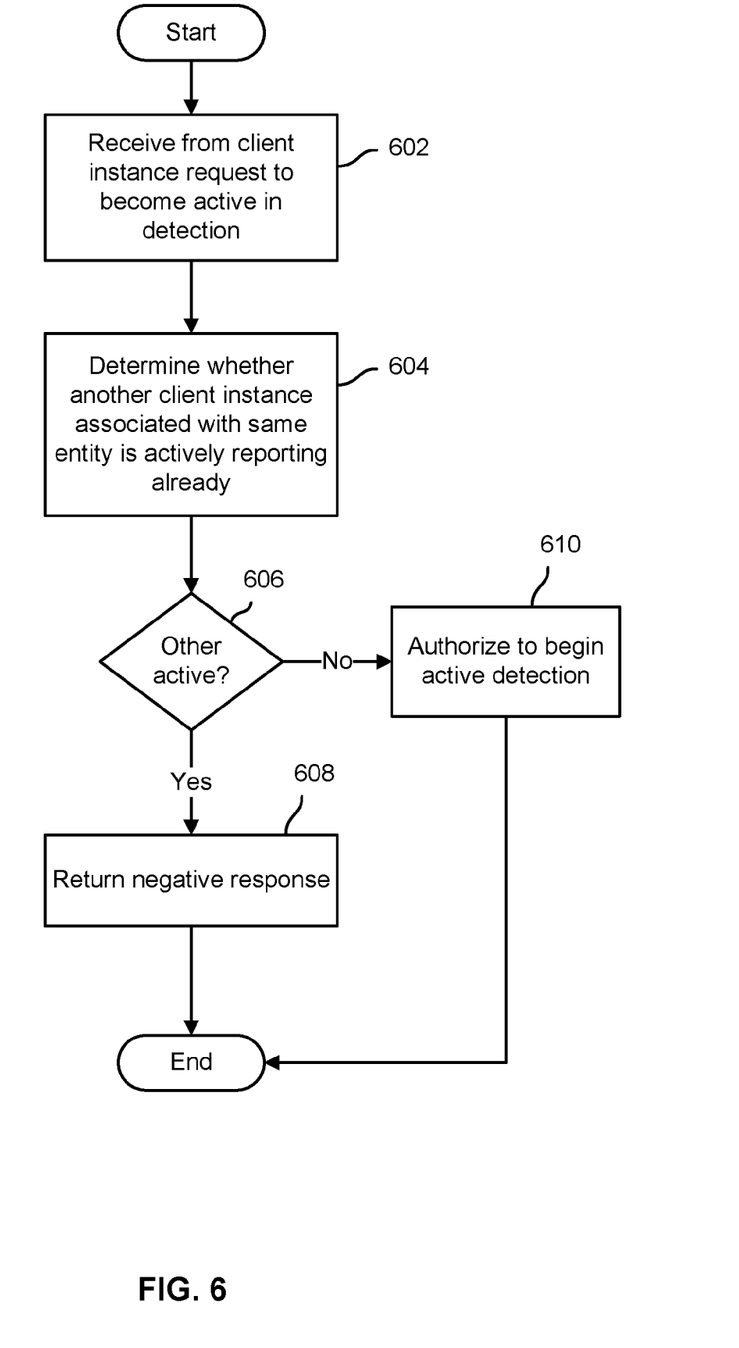
FIG. 6 is a flow chart illustrating an embodiment of a process to coordinate media detection processing by a plurality of listening agents.

FIG. 6 is a flow chart illustrating an embodiment of a process to coordinate media detection processing by a plurality of listening agents. In various embodiments, the process of FIG. 6 may be performed by a remote server, e.g., a detection server such as detection server 112 of FIG. 1 and/or a local service provided on a client device. In the example shown, a request to become active in media detection processing is received from a client instance, e.g., an instance of SDK or other code associated with a particular app on a client device (602). It is determined whether another client instance, e.g., SDK code associated with another app on the same device, is already actively engaged in media content detection (604). If another app (or other code) is already actively engaged in performing media detection (606), a negative response is sent (608) to the requesting app (602). The requesting app may be configured to send a further request, e.g., after a configured wait period (see, e.g., the process of FIG. 5). In some embodiments, a server/service performing the process of FIG. 6 may be configured to determine that another app is already actively engaged in media detection if another agent on the same client device has submitted a feature set or other representation of sampled audio data within a prescribed (e.g., configurable) period.

If no other app is actively engaged in media detection at the same client device (or at the same physical location, across devices, in some embodiments) (606), the requesting app (602) is given permission to begin active media detection (610). The app (or SDK or other code included in the app) may be configured to begin active listening, feature extraction, and feature reporting, for example, in response to being given permission to become active in media detection processing.

Figure 7:
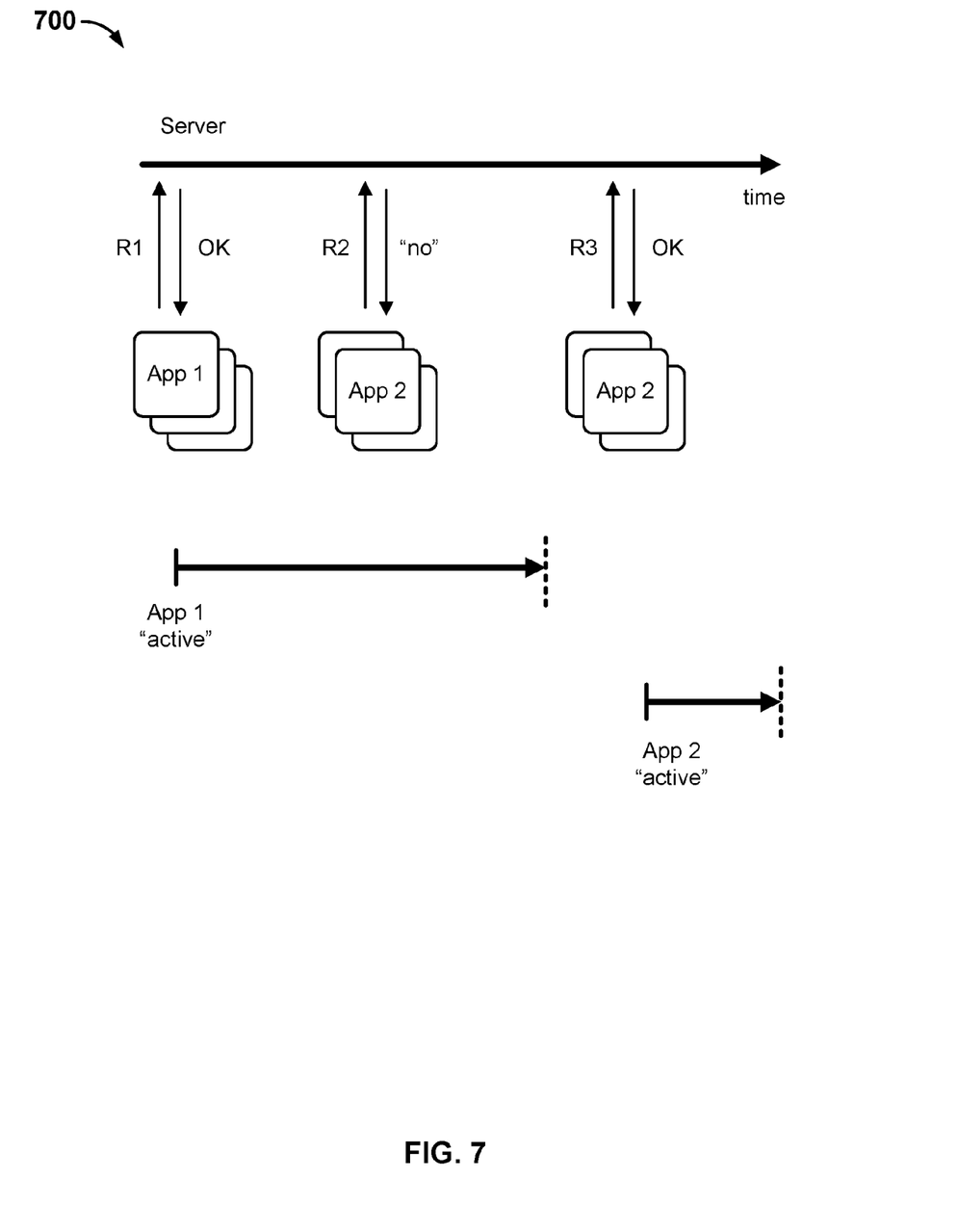
FIG. 7 is a block diagram illustrating an embodiment of a system to detect ambient media.

FIG. 7 is a block diagram illustrating an embodiment of a system to detect ambient media. In the example 700 shown, the server (or local coordinating service) receives at a first time a request R1 from "App 1" to become active in media detection. In this example, at the time of request R1 no other app is already engaged actively in media detection, and as a result a positive response is sent by the server to "App 1", which becomes actively engaged in media detection. Subsequently, at a second time at which App 1 has remained active in reporting media detection related data (e.g., periodically sending a feature set), a second application "App 2" becomes active on the client device, e.g., in the background or in the foreground while App 1 remains running in the background, and sends a request R2 to become active in media detection processing. Since at the time of request R2 the first application (App 1) has remained active, the server returns to App 2 a negative response to the request R2. At a later time, subsequent to request R2, the first application "App 1" has stopped being actively engaged in media detection. For example, a user of the client device may have stopped App 1 from running in the background. As a result, a third request R3 sent by the second application App 2, e.g., after App 2 has waited for a prescribed and/or random wait interval, receives a positive response from the server, resulting in App 2 becoming active in media detection processing.

Figure 8:
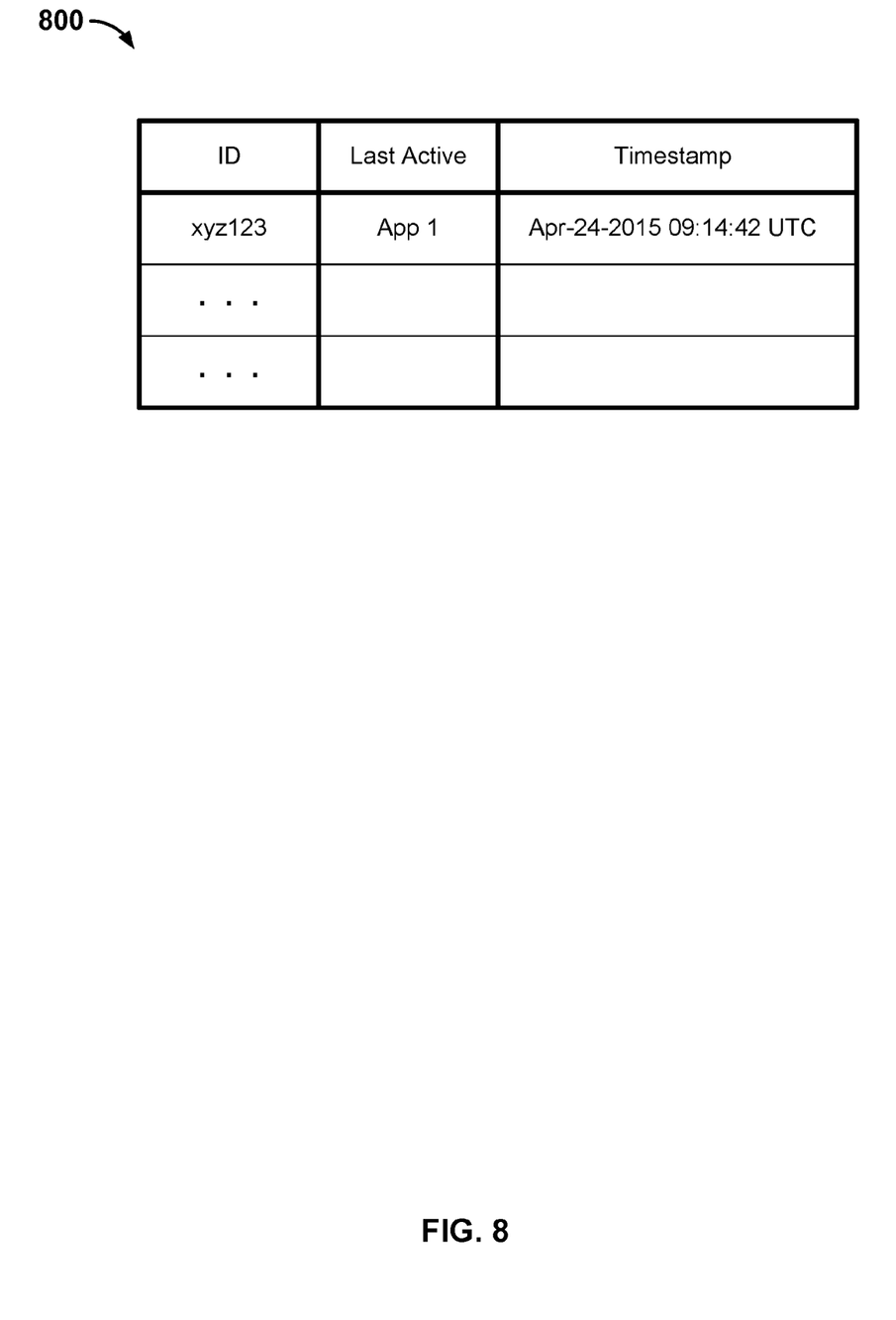
FIG. 8 is a block diagram illustrating of a data structure to track currently active listening agents in an embodiment of a system to detect ambient media.

FIG. 8 is a block diagram illustrating of a data structure to track currently active listening agents in an embodiment of a system to detect ambient media. In some embodiments, the data structure of FIG. 8 may be used to keep track of which listening/reporting entities (e.g., apps) on which devices currently are active (if any) in performing media detection. In the example shown, the data structure 800 comprises a table having for each of a plurality of client devices (and/or users, locations, etc.) a first entry that identifies the client device/user/location by a unique identifier, a second entry that identifies an app or other agent from which a representation of audio data (e.g., a feature set) to be used in media detection was last received, and a third entry indicating a time at which the last data was received. In some embodiments, data stored in a data structure such as the data structure 800 of FIG. 8 may be used to determine whether an agent is already actively engaged in media detection process on a client device. For example, on receiving the request R2 from the application App 2 in the example shown in FIG. 7, the server may read from the data structure 800 of FIG. 8 that the application App 1 last provided a feature set from the same client device. The time indicated may be read and used to determine whether the most recently received feature set was received within a prescribed period. If not, e.g., because the application that last reported has become inactive, the subsequently-requesting application may be sent a response indicating that it should become active in media detection.

In some embodiments, the process doesn't change if a recognition-capable app is in foreground mode (i.e., the user is using the app at that time). In some embodiments, each of the apps must ask the server for permission to become active in performing TV or other media content recognition, whether the app is running in the foreground or instead running in the background.

In various embodiments, the recognition-related requests and/or activity is logged to keep track of it. In various embodiments, statistical analysis may be performed to determine the best values to be used for parameters such as the delay before retries (502, 506) and the number of attempts (e.g., per app, per period), in order to reduce the collision between different requests.

Using techniques disclosed herein, the media detection processing performed by multiple agents on a client device and/or across multiple client devices in the same location may be coordinated, enabling device and network resources to be used efficiently.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of coordinating ambient media detection, comprising:
   in response to receiving from a first ambient media detection agent in an environment, via a communication interface, a request to become active in performing media recognition processing with respect to audio content recognition in the environment:
      determining, via a processor, that a second ambient media detection agent is active in the environment currently performing media recognition processing with respect to audio content recognition in the environment; and
      based at least on the determination, sending to the first ambient media detection agent, via the communication interface, a response of whether to permit or deny the request,
   wherein the request from the first ambient media detection agent comprises sample audio from the environment,
   wherein the determination is based on whether sample audio from the second media detection agent indicates that the second ambient media detection agent is active in the environment, and
   wherein performing media recognition processing with respect to audio content recognition in the environment comprises extracting a set of audio features from the audio in the environment.

2. The method of claim 1, wherein the first ambient detection agent and the second ambient detection agent are associated with a same client device.

3. The method of claim 2, wherein the first ambient detection agent comprises software code associated with a first client application installed on the client device.

4. The method of claim 3, wherein the second ambient detection agent comprises software code associated with a second client application installed on the client device.

5. The method of claim 4, wherein the software code associated with a first client application and the software code associated with a second client application are associated with a software development kit (SDK) or other code configured to perform media detection.

6. The method of claim 1, wherein the request is received at a server configured to perform media recognition processing based on a set of features received from either the first ambient media detection agent or the second ambient media detection agent, wherein the extracted set of features are audible audio portions from the media content.

7. The method of claim 1, wherein the request comprises a first request and further comprising receiving from the first ambient media detection agent at a subsequent time subsequent to the first request a second request from the first ambient media detection agent to become active in performing media detection processing with respect to the audio in the environment; determining at or near the subsequent time that no other ambient media detection agent is active currently in performing media detection processing with respect to the audio in the environment; and providing, based at least on the determination, a response granting the subsequent request by the first ambient media detection agent to become active in media detection processing with respect to the audio in the environment.

8. The method of claim 1, wherein the first ambient media detection agent is associated with a first client device associated with the environment and the second ambient media detection agent is associated with a second client device associated with the environment.

9. The method of claim 1, wherein the determination that the second ambient media detection agent associated with the environment currently is active in performing media detection processing with respect to the environment is made based at least on a stored time associated with a last media detection-related data received from the second ambient media detection agent.

10. A system to coordinate ambient media detection, comprising:
    a communication interface; and
    a processor coupled to the communication interface and configured to:
       in response to receipt, from a first ambient media detection agent in an environment, via the communication interface, a request to become active in performing media recognition processing with respect to audio in the environment:
          determine whether a second ambient media detection agent is active in the environment performing media recognition processing with respect to audio content recognition in the environment; and
          based at least on the determination, send to the first ambient media detection agent, via the communication interface, a response of whether to permit or deny the request,
    wherein the request from the first ambient media detection agent comprises sample audio from the environment,
    wherein the determination is based on whether sample audio from the second media detection agent indicates that the second ambient media detection agent is active in the environment, and
    wherein performing media recognition processing with respect to audio content recognition in the environment comprises extracting a set of audio features from the audio environment.

11. The system of claim 10, wherein the first ambient detection agent and the second ambient detection agent are associated with a same client device.

12. The system of claim 11, wherein the first ambient detection agent comprises software code associated with a first client application installed on the client device.

13. The system of claim 12, wherein the second ambient detection agent comprises software code associated with a second client application installed on the client device.

14. The system of claim 13, wherein the software code associated with a first client application and the software code associated with a second client application are associated with a software development kit (SDK) or other code configured to perform media detection.

15. The system of claim 10, wherein the request is received at a server configured to perform media detection processing based on a set of features received from either the first ambient media detection agent or the second ambient media detection agent.

16. The system of claim 15, wherein the request comprises a first request and the processor is further configured to receive from the first ambient media detection agent at a subsequent time subsequent to the first request a second request from the first ambient media detection agent to become active in performing media detection processing with respect to the audio in the environment; determine at or near the subsequent time that no other ambient media detection agent is active currently in performing media detection processing with respect to the audio in the environment; and provide, based at least on the determination, a response granting the subsequent request by the first ambient media detection agent to become active in media detection processing with respect to the audio in the environment.

17. The system of claim 10, wherein the first ambient media detection agent is associated with a first client device associated with the environment and the second ambient media detection agent is associated with a second client device associated with the environment.

18. A computer program product to coordinate ambient media detection, the computer program product being embodied in a non-transitory computer readable storage medium and comprising computer instructions for:
- in response to receiving, from a first ambient media detection agent associated with an audio environment, via a communication interface, a request to become active in performing media recognition processing with respect to audio in the environment:
- determining, via a processor, whether a second ambient media detection agent is active in the environment performing media recognition processing with respect to audio content recognition in the environment; and
- based at least on the determination, sending to the first ambient media detection agent, via the communication interface, a response of whether to permit or deny the request,
- wherein the request from the first ambient media detection agent comprises sample audio from the environment,
- wherein the determination is based on whether sample audio from the second media detection agent indicates that the second ambient media detection agent is active in the environment, and
- wherein performing media recognition processing with respect to audio content recognition in the environment comprises extracting a set of audio features from the audio environment.

* * * * *